(12) United States Patent
Lu et al.

(10) Patent No.: US 10,260,121 B2
(45) Date of Patent: Apr. 16, 2019

(54) INCREASING STEEL IMPACT TOUGHNESS

(71) Applicant: GM GLOBAL TECHNOLOGY OPERATIONS LLC, Detroit, MI (US)

(72) Inventors: Qi Lu, Shanghai (CN); Jianfeng Wang, Nanjing (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 160 days.

(21) Appl. No.: 15/426,518

(22) Filed: Feb. 7, 2017

(65) Prior Publication Data

US 2018/0223385 A1  Aug. 9, 2018

(51) Int. Cl.

| | |
|---|---|
| *C21D 1/19* | (2006.01) |
| *C21D 1/40* | (2006.01) |
| *C21D 1/42* | (2006.01) |
| *C21D 1/52* | (2006.01) |
| *C21D 8/00* | (2006.01) |
| *C21D 9/00* | (2006.01) |
| *C21D 1/673* | (2006.01) |

(Continued)

(52) U.S. Cl.
CPC .............. *C21D 9/0068* (2013.01); *C21D 1/19* (2013.01); *C21D 1/40* (2013.01); *C21D 1/42* (2013.01); *C21D 1/52* (2013.01); *C21D 1/673* (2013.01); *C21D 8/005* (2013.01); *C22C 38/02* (2013.01); *C22C 38/06* (2013.01); *C22C 38/22* (2013.01); *C22C 38/34* (2013.01); *C22C 38/38* (2013.01); *C21D 2211/001* (2013.01); *C21D 2211/008* (2013.01); *Y02P 10/253* (2015.11)

(58) Field of Classification Search
None
See application file for complete search history.

(56) References Cited

U.S. PATENT DOCUMENTS

| 8,252,125 B2 | 8/2012 | Giefers et al. |
| 8,518,195 B2 | 8/2013 | Bradley |
| | (Continued) | |

FOREIGN PATENT DOCUMENTS

| CA | 2 462 320 | 9/2005 |
| CN | 101100724 | 1/2008 |
| | (Continued) | |

*Primary Examiner* — Anthony J Zimmer
(74) *Attorney, Agent, or Firm* — Harness, Dickey & Pierce, P.L.C.

(57) ABSTRACT

In a method for increasing steel impact toughness, the steel composition contains from about 5 wt % to about 10 wt % manganese and has a martensite finish temperature ($M_f$) below room temperature. The steel composition is exposed to hot forming to form a steel part. During hot forming, the steel composition is subjected to a heat treatment temperature above its fully austenite formed temperature, is transferred to a die, and while in the die, is simultaneously formed and quenched. In one example, quenching cools the steel composition to room temperature, and the steel part is removed from the die and reheated to a baking temperature ranging from about 120° C. to about 400° C. In another example, quenching is interrupted at an interruption temperature ranging from about 120° C. to about 400° C., and the steel composition is maintained at the interruption temperature for a predetermined time and then is cooled to room temperature.

20 Claims, 3 Drawing Sheets

(51) Int. Cl.
*C22C 38/02* (2006.01)
*C22C 38/06* (2006.01)
*C22C 38/22* (2006.01)
*C22C 38/34* (2006.01)
*C22C 38/38* (2006.01)

(56) References Cited

U.S. PATENT DOCUMENTS

| | | |
|---|---|---|
| 8,535,457 B2 | 9/2013 | Maeda |
| 8,778,261 B2 | 7/2014 | Nakamura et al. |
| 8,888,838 B2 | 11/2014 | Blanzy |
| 8,932,416 B2 | 1/2015 | Nakanishi et al. |
| 8,956,470 B2 | 2/2015 | Bhadeshia et al. |
| 8,992,697 B2 | 3/2015 | Matsuda et al. |
| 9,121,087 B2 | 9/2015 | Matsuda et al. |
| 9,359,663 B2 | 6/2016 | Mizuta et al. |
| 9,475,113 B2 | 10/2016 | Naitou et al. |
| 9,512,499 B2 | 12/2016 | Tomokiyo et al. |
| 9,593,392 B2 | 3/2017 | John et al. |
| 9,598,745 B2 | 3/2017 | Hayashi et al. |
| 9,605,329 B2 | 3/2017 | Nonaka et al. |
| 9,611,518 B2 | 4/2017 | Naitou et al. |
| 9,617,624 B2 | 4/2017 | Tanahashi et al. |
| 9,644,247 B2 | 5/2017 | Matsuda et al. |
| 9,725,782 B2 | 8/2017 | Nonaka et al. |
| 9,840,751 B2 | 12/2017 | Hayashi et al. |
| 9,850,554 B2 | 12/2017 | Naitou et al. |
| 9,896,736 B2 | 2/2018 | Tomokiyo et al. |
| 9,920,407 B2 | 3/2018 | Nonaka et al. |
| 9,945,013 B2 | 4/2018 | Nonaka et al. |
| 10,029,294 B2 | 7/2018 | Yamano et al. |
| 10,030,280 B2 | 7/2018 | Hayashi et al. |
| 10,072,324 B2 | 9/2018 | Nonaka et al. |
| 2006/0011274 A1 | 1/2006 | Speer et al. |
| 2010/0263771 A1 | 10/2010 | Kim |
| 2014/0227546 A1 | 8/2014 | Mesplont et al. |
| 2014/0230969 A1 | 8/2014 | Sugimoto et al. |
| 2014/0322559 A1 | 10/2014 | Becker et al. |
| 2016/0145731 A1 | 5/2016 | Sachdev et al. |
| 2016/0312323 A1* | 10/2016 | Rana .................... C21D 9/0068 |
| 2016/0319389 A1* | 11/2016 | Hayashi .................... C21D 9/46 |
| 2017/0314088 A1 | 11/2017 | Wang |
| 2017/0314089 A1* | 11/2017 | Wang ........................ C23C 2/34 |
| 2018/0216205 A1 | 8/2018 | Wang et al. |

FOREIGN PATENT DOCUMENTS

| | | |
|---|---|---|
| CN | 102618782 | 8/2012 |
| WO | WO 2009/082107 | 7/2009 |
| WO | WO-2016106621 A1 | 7/2016 |

* cited by examiner

INCREASING STEEL IMPACT TOUGHNESS

INTRODUCTION

Steel is an alloy of iron and other elements that is widely used in a variety of industries (e.g., construction, aerospace, automotive, heavy equipment, etc.) and applications (e.g., building of roads, railways, appliances, buildings, automobile parts/components, kitchen utensils, etc.). Steel can be formed into a desired product using several different processes, examples of which include rolling, forging, casting, press hardening (i.e., hot stamping or hot forming), etc. Some of these processes can be performed hot or cold. Hot processes generally involve improved formability and result in tough, strong parts with complex shapes.

SUMMARY

Examples of a method for increasing steel impact toughness are disclosed herein. In an example, the steel composition used in the method contains from about 5 wt % to about 10 wt % manganese and has a martensite finish temperature ($M_f$) below room temperature. The steel composition is exposed to hot forming to form a steel part. During hot forming, the steel composition is subjected to a heat treatment temperature above a fully austenite formed temperature of the steel composition, is transferred to a die, and while in the die, is simultaneously formed and quenched. In one example, quenching cools the steel composition to room temperature, and the formed steel part is removed from the die and is reheated to a baking temperature ranging from about 120° C. to about 400° C. In another example, quenching is interrupted at an interruption temperature ranging from about 120° C. to about 400° C., and the steel composition is maintained at the interruption temperature for a predetermined time and then is cooled to room temperature.

Examples of a steel part are also disclosed herein. These steel parts are formed by the methods disclosed herein. In an example, the steel part includes manganese in an amount ranging from about 5 wt % to about 10 wt %; carbon in an amount ranging from about 0.1 wt % to about 0.4 wt %; a total amount of silicon and aluminum ranging from 0 wt % to about 3 wt %; chromium in an amount ranging from 0 wt % to about 0.5 wt %; molybdenum in an amount ranging from 0 wt % to about 0.5 wt %; and a balance of iron. After being formed via the method(s) disclosed herein, from about 3 vol. % to about 15 vol. % of the steel part is retained austenite and from about 85 vol. % to about 97 vol. % of the steel part is martensite. The steel part has a Charpy V-notch impact toughness ranging from about 60 J/cm² to about 100 J/cm².

Examples of a steel composition are also disclosed herein. In an example, the steel composition includes manganese; carbon in an amount ranging from about 0.1 wt % to about 0.4 wt %; a total amount of silicon and aluminum ranging from 0 wt % to about 3 wt %; chromium in an amount ranging from 0 wt % to about 0.5 wt %; molybdenum in an amount ranging from 0 wt % to about 0.5 wt %; and a balance of iron. The manganese is present in an amount sufficient to provide a Charpy V-notch impact toughness ranging from about 60 J/cm² to about 100 J/cm² after the steel composition has been exposed to a post hot forming reheating process that involves a baking temperature ranging from about 120° C. to about 400° C., or to a quenching interruption process that involves a maintenance temperature ranging from about 120° C. to about 400° C.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method disclosed herein couple a steel composition that includes a particular amount of manganese with a hot forming process and a post hot forming heat treatment or a hot forming process and a quenching interruption process. These material and processing combinations have been found to significantly improve the impact/fracture toughness of the resulting steel part. In particular, the manganese amount reduces the martensite finish ($M_f$) temperature of the steel composition to below room temperature (where room temperature ranges from about 18° C. to about 25° C.). This enables the steel composition to have some retained austenite when quenched in accordance with the examples disclosed herein. In some examples, quenching to room temperature is followed by the post hot forming heat treatment, which is a low temperature baking process that takes place slightly above the martensite start ($M_s$) temperature of the steel composition or between the $M_S$ and the $M_f$ of the steel composition. In other examples, quenching is interrupted before room temperature is reached. For example, quenching is suspended at a low temperature that is slightly above the martensite start ($M_s$) temperature of the steel composition or between the $M_S$ and the $M_f$ of the steel composition. Both of the treatments disclosed herein have been found to promote carbon diffusion from the martensite phase to the retained austenite phase. This increases the carbon content in the retained austenite, which increases the stability of the austenite phase and of the overall steel part that is formed.

The amount of manganese in the steel composition also enables less energy to be used throughout the hot forming process of the methods disclosed herein. For example, the steel composition disclosed herein has a lower fully austenite formed temperature (i.e., $A_f$) than steel compositions with a lower amount of manganese (e.g., 22MnB5). As such, the energy used to heat the blank of the steel composition disclosed herein above its $A_f$ temperature prior to hot forming will be lower than the energy used to heat a blank of a lower manganese steel above its $A_f$ temperature. As a specific example, the $A_f$ for an example of the steel composition disclosed herein is below 730° C. and the $A_f$ for 22MnB5 typically ranges from about 750° C. to about 830° C.

As mentioned above, the steel part(s) formed from the material and methods disclosed herein exhibit improved impact/fracture toughness. It has been found that this mechanical property is present in the steel part(s) disclosed herein even at low temperatures (e.g., down to −40° C.). The martensite portion of the steel part may increase as the temperature decreases. This can decrease the fracture toughness of the steel part. However, when retained austenite is present and transforms into martensite, its volume expands, which creates a compressive stress on the neighboring/adjacent material volume. When the retained austenite to martensite transformation occurs ahead of a propagating crack, the compressive stress helps to arrest (i.e., stop or close) the otherwise advancing crack front. As such, the retained austenite in the steel part effectively improves the toughness.

Figure 1:
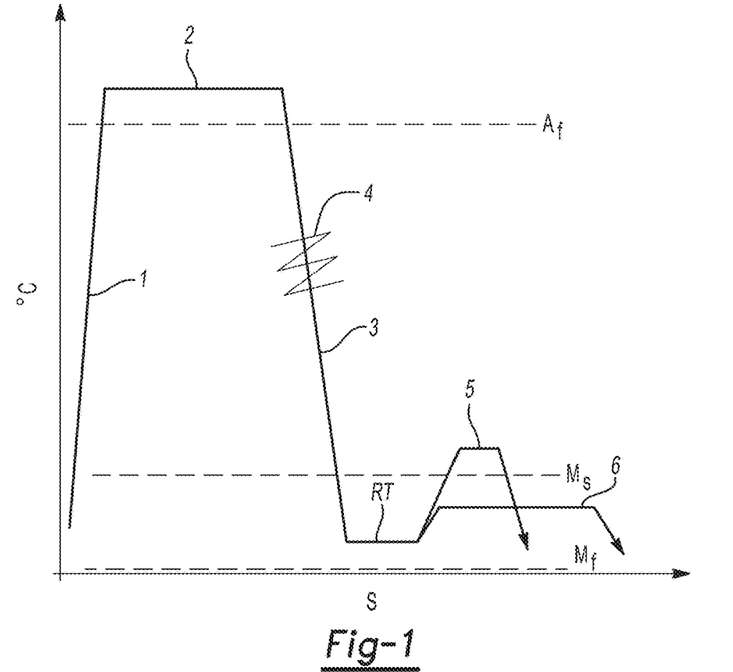
FIG. 1 is a schematic illustration of an example of the method disclosed herein, showing temperature changes over time.
Figure 2:
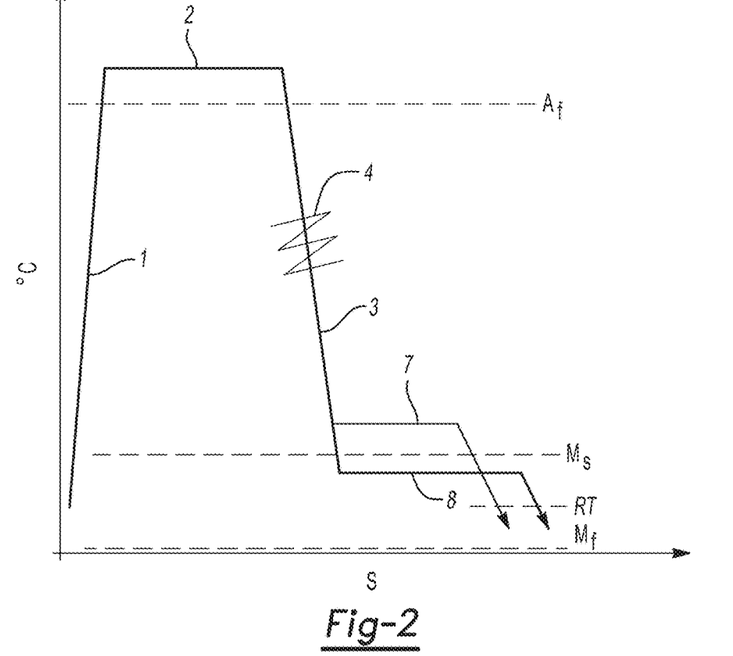
FIG. 2 is a schematic illustration of another example of the method disclosed herein, showing temperature changes over time.

Referring now to FIGS. 1 and 2, examples of the method are shown on graphs of temperature (Y axis, ° C.) versus time (X axis, S (seconds)). FIGS. 1 and 2 do not include particular values for the temperature and time, as these may vary depending upon the exact steel composition and the example of the method being utilized. Rather, FIGS. 1 and 2 generally illustrate that the various steps of the methods may take place at different temperatures over time, and that some of the steps take place at a steady or maintained temperature for a time period. It is to be understood that specific examples of suitable temperature values and time periods for the example methods are described further herein.

Examples of the method disclosed herein utilize a particular steel composition. In some examples, the steel composition includes, consists essentially of, or consists of manganese (Mn); carbon (C) in an amount ranging from about 0.1 wt % to about 0.4 wt %; a total amount of silicon (Si) and aluminum (Al) ranging from 0 wt % to about 3 wt % (where silicon ranges from about 0.2 wt % to about 2 wt % and aluminum ranges from about 0.1 wt % to about 2.8 wt %); chromium (Cr) in an amount ranging from 0 wt % to about 0.5 wt %; molybdenum (Mo) in an amount ranging from 0 wt % to about 0.5 wt %; and a balance of iron (Fe). When the steel composition consists essentially of the listed elements, particular element(s) may not be intentionally added to the alloy, but may be present in a small amount that equates to an inevitable impurity. Examples of impurity elements include phosphorus (P), sulfur (S), titanium (Ti), nitrogen (N), oxygen (O), niobium (Nb), and vanadium (V). When the steel composition consists of the listed elements, it is to be understood that no other components are included. In the examples of the steel composition disclosed herein, the manganese is present in an amount sufficient to provide a Charpy V-notch impact toughness ranging from about 60 J/cm² to about 100 J/cm² after the steel composition has been exposed to the methods (and in particular, the post hot forming reheating process or the quenching interruption process) disclosed herein. As an example, the manganese amount ranges from about 5 wt % to about 10 wt %.

The steel composition disclosed herein has a martensite finish temperature ($M_f$) that is below room temperature. In an example, the $M_f$ may be below −196° C. The martensite start temperature ($M_s$) of the steel composition will be a function of the chemical composition (mainly C and Mn) and austenite grain size. There are several empirical models to calculate $M_s$ (see Lee, et al, "Prediction of Martensite Start Temperature in Alloy Steels with Different Grain Sizes," Metallurgical and Materials Transactions, Vol. 44A, August 2013, 3423-3427). As one example, $M_s$ may be calculated according to equation I:

$$Ms=475.9-335.1*C\ \%-34.5*Mn\ \%-1.3*Si\ \%-15.5*Ni\ \%-13.1*Cr\ \%-10.7*Mo\ \%-9.6*Cu\ \%+11.67*\ln(d) \quad (I)$$

where d is the average diameter of the austenite grains. In an example with 0.15% C and 7% Mn, the steel composition may have an $M_s$ at 230° C. In an example, the steel composition disclosed herein has a martensite finish temperature ($M_f$) ranging from about −200° C. to about 0° C., a martensite start temperature ($M_s$) ranging from about 180° C. to about 300° C., and an austenite finish temperature ($A_f$ or $Ac_3$, i.e., the temperature at which transformation of ferrite to austenite is completed during heating) ranging from about 650° C. to about 850° C. As mentioned above, the medium amount of manganese reduces the $M_f$ of the steel composition, but the exact $M_f$, $M_s$, and $A_f$ will depend upon the exact composition of the steel composition.

In the examples of the method disclosed herein, an example of the steel composition disclosed herein is exposed to hot forming (reference numerals 1-4 in FIG. 1) and then to a post hot forming reheating process (reference numeral 5 or 6 in FIG. 1).

The hot forming process involves subjecting the steel composition to a heat treatment temperature above a fully austenite formed temperature (i.e., $A_f$) of the steel composition, as shown at reference numeral 1 and 2 in FIGS. 1 and 2. It is to be understood that the steel composition itself will heat to at least the $A_f$ temperature, so that it transforms to the austenite state and becomes more malleable. In an example, the heat treatment temperature may range from about 720° C. to about 850° C. In a specific example, the heat treatment temperature is about 800° C.

The austenitization of the steel composition may be accomplished by quickly heating the steel composition above the $A_f$ (reference numeral 1 in FIGS. 1 and 2), and then maintaining the steel composition at that temperature for a predetermined time period (reference numeral 2 in FIGS. 1 and 2). Depending upon the method of heating that is used, the heating rate may vary from about 5° C. per second to about 200° C. per second. In an example, the steel composition is maintained at the heat treatment temperature for a time period ranging from about 180 seconds to about 1000 seconds. In one example, the steel composition may be heated to about 800° C. in about 90 seconds, and then the steel composition may be maintained at about 800° C. for about 360 seconds.

It is to be understood that subjecting the steel composition to the heat treatment temperature may be accomplished by introducing a steel composition blank into a furnace that is set at the desired heat treatment temperature (e.g., within ±5° C. to 10° of the desired heat treatment temperature), and then heating the steel composition blank in the furnace. In an example, furnace heating is accomplished via convection by air and conduction with bricks. Other heating methods may also be used. Examples of other suitable heating methods include infrared heating, resistance heating, induction heating, etc.

The method then involves transferring the steel composition (i.e., in the austenite state) to a die or other press and drawing tool. The die is closed for simultaneous hot forming and quenching (reference numerals 4 and 3 in FIGS. 1 and 2). The transfer of the steel composition to the die or other press and drawing tool may be accomplished via an automated process (e.g., a robot in a production line) or manually.

The steel composition (i.e., in the austenite, and more malleable, state) takes on the shape of the die, and thus begins to form into a desired part shape as soon as it is introduced into the die and the die is closed. The die may be cooler than the heat treatment temperature, and thus quenching may begin as soon as the steel composition is transferred to the die. As such, while in the die, the steel composition is simultaneously quenched (as shown at reference numeral 3) and formed (as shown at reference numeral 4). Hot forming at reference numeral 4 results in the formation of the steel part. As such, the processes performed at references numerals 5, 6, 7, and 8 in FIGS. 1 and 2 are performed on the steel part. In reference to reference numeral 5, 6, 7, and 8, the terms steel composition and steel part may be used interchangeably.

In the examples of the method disclosed herein, different processes may occur after or during quenching. FIG. 1 shows two examples of the method (labeled 5 and 6) that involve cooling the steel composition/part to room temperature RT (i.e., from about 18° C. to about 25° C.) and then reheating the steel part to a baking temperature ranging from about 120° C. to about 400° C. FIG. 2 shows two other examples of the method (labeled 7 and 8) that involve interrupting the quenching process at an interruption temperature ranging from about 120° C. to about 400° C., maintaining the steel composition/part at the interruption temperature for a predetermined time, and then cooling the steel composition/part to room temperature RT.

In the examples of the method shown in FIG. 1, quenching involves passively or actively cooling the steel composition/part therein to a quenching temperature that is between the $M_s$ and the $M_f$ of the steel composition. In the examples shown in FIG. 1, the steel composition/part is quenched to room temperature RT. Passive cooling may involve allowing the formed steel composition (i.e., part) in the die or removed from the die to cool to room temperature RT without any mechanism to speed up the cooling process. Active cooling may involve cooling the die (having the formed steel composition, i.e., part, therein) with cold air or a cold liquid medium (e.g., cold water), which may be introduced into cooling canals integrated within the die. Active cooling can speed up the quenching process. Both passive and active cooling allow the retained austenite to form in the steel part, and thus any desirable cooling conditions may be used.

Quenching may take place over a quenching time period ranging from about 5 seconds to about 1000 seconds.

The quenching process shown in FIG. 1 enables the formed steel composition (i.e., part) to harden. In any of the examples disclosed herein, any desirable steel part may be formed, including automotive parts, heavy equipment parts, aircraft parts, etc. As some specific examples, steel parts that can be formed include door impact beams, bumper beams, AB pillars, roof rails, central floor tunnels, blades for lawn mowers, etc.

In the methods shown in FIG. 1, the steel part is then exposed to the post hot forming reheating process. Both examples of the reheating process (reference numerals 5 and 6) shown in FIG. 1 involve reheating the steel part to a baking temperature ranging from about 120° C. to about 400° C. At the reheating temperatures of both 5 and 6, the carbon in the supersaturated martensite diffuses out (i.e., partitions) to the retained austenite. This diffusion increases the carbon content in the retained austenite, which increases the stability of the retained austenite.

The reheating method shown at reference numeral 5 involves heating the steel part to a baking temperature ranging from about 200° C. to about 400° C. for a reheating time period ranging from about 1 minute to about 30 minutes. In this example, the maximum baking temperature to which the steel part may be heated is above $M_s$. The reheating of the steel part may be accomplished by quickly heating the steel part to the baking temperature, and then maintaining the steel part at that temperature for a predetermined time period. As examples, the steel part may be heated to 250° C. and maintained at that temperature for about 5 minutes, or the steel part may be heated to 300° C. and maintained at that temperature for about 3 minutes, or the steel part may be heated to 400° C. and maintained at that temperature for about 1 minute. The higher reheating temperature in this example allows for a shorter reheating time.

The reheating method shown at reference numeral 6 involves heating the steel part to a baking temperature ranging from about 120° C. to about 200° C. for a reheating time period ranging from about 5 minutes to about 120 minutes. In this example, the maximum baking temperature to which the steel part may be heated is between room temperature RT and $M_s$. The reheating of the steel part may be accomplished by quickly heating the steel part to the baking temperature, and then maintaining the steel part at that temperature for a predetermined time period. As examples, the steel part may be heated to 150° C. and maintained at that temperature for about 30 minutes, or the steel part may be heated to 170° C. and maintained at that temperature for about 20 minutes, or the steel part may be heated to 200° C. and maintained at that temperature for about 15 minutes.

It is to be understood that prior to reheating via either the method shown at reference numeral 5 or the method shown at reference numeral 6, the steel part may be removed from the die and then reheated.

Reheating may be accomplished using a furnace, by direct flame heating the steel part, by induction heating, or by heating the steel part via resistance heating. When the reheating temperature is between about 150° C. and about 200° C., the reheating treatment may take place at a paint baking shop of an assembly plant.

After reheating via either the example shown at reference numeral 5 or at reference numeral 6, the steel part may then be allowed to cool back to room temperature.

In the examples of the method shown in FIG. 2, quenching involves passively or actively cooling the steel composition/part in the die until the steel composition/part is at a temperature ranging from about 120° C. to about 400° C. At this temperature (referred to herein as the interruption temperature), quenching is interrupted (i.e., ceased, stopped, etc.) and the steel composition/part is maintained at the interruption temperature for a predetermined amount of time (i.e., holding time) before being cooled to room temperature. As will be described in more detail below, the predetermined amount of time may be as short as about 0 (zero) seconds or as long as 30 minutes.

When passive cooling is utilized to quench, quenching may be interrupted by exposing the steel composition/part to heat that will maintain the temperature of the steel composition/part at the interruption temperature for a predetermined period/amount of time. Any of the previously described heating methods may be used.

When active cooling in the die is utilized to quench, quenching may be interrupted by turning off the active cooling mechanism for the die. For example, the flow of coolant to the die may be turned off. The steel composition/part will then be maintained at the interruption temperature for some amount of time until it begins to cool on its own or until active cooling is reinitiated.

In the example shown at reference numeral 7, the quenching is interrupted when the steel composition/part ranges from about 200° C. to about 400° C. The maximum interruption temperature is above the $M_s$ of the steel composition. In this example, since the interruption temperature is relatively high, the steel composition/part may be maintained at this temperature for a relatively short (predetermined) period of time (i.e., holding time) before additional cooling takes place. For example, the steel composition/part may be maintained at the relatively high interruption temperature for a time period ranging from about 1 minute to about 30 minutes. As more specific examples, the quenching of the steel composition/part may be interrupted at 250° C. and the composition/part may be maintained at that temperature for about 5 minutes, or the quenching of the steel composition/part may be interrupted at 300° C. and the composition/part may be maintained at that temperature for about 3 minutes, or the quenching of the steel composition/part may be interrupted at 400° C. and the composition/part may be maintained at that temperature for about 1 minute.

In the example shown at reference numeral 8, the quenching is interrupted when the steel composition/part ranges from about 120° C. to about 200° C. In this example, the maximum interruption temperature is between room temperature RT and $M_s$. In this example, since the interruption temperature is relatively low, the steel composition/part may be maintained at this temperature for a longer (predetermined) period of time (i.e., holding time) before additional cooling takes place. For example, the steel composition/part may be maintained at the relatively low interruption temperature for a time period ranging from about 5 minutes to about 120 minutes. As more specific examples, the quenching of the steel composition/part may be interrupted at 150° C. and the composition/part may be maintained at that temperature for about 30 minutes, or the quenching of the steel composition/part may be interrupted at 170° C. and the composition/part may be maintained at that temperature for about 20 minutes, or the quenching of the steel composition/part may be interrupted at 200° C. and the composition/part may be maintained at that temperature for about 15 minutes.

After being maintained at the interruption temperature for the predetermined period of time, as shown at reference numeral 7 or at reference numeral 8, the steel composition/part may then be cooled (passively or actively) to room temperature RT (i.e., from about 18° C. to about 25° C.).

In another example not illustrated in FIG. 2, the quenching is interrupted when the steel composition/part ranges from about 120° C. to about 400° C. In this example, dynamic partitioning takes place. In other words, once quenching is interrupted, the steel composition/part may be immediately removed from the die and directly cooled to room temperature in air or utilizing a slow cooling rate. In this example then, the holding time or the predetermined time that the composition/part is maintained at the interruption temperature is up to 5 seconds, and may be almost 0 seconds.

The additional cooling process shown in FIG. 2 and in the example not illustrated enables the formed steel composition (i.e., part) to harden.

The steel part(s) formed from the methods shown in FIGS. 1 and 2, retain the composition of the initial steel composition (i.e., manganese in an amount ranging from about 5 wt % to about 10 wt %; carbon in an amount ranging from about 0.1 wt % to about 0.4 wt %; a total amount of silicon and aluminum ranging from 0 wt % to about 3 wt %; chromium in an amount ranging from 0 wt % to about 0.5 wt %; molybdenum in an amount ranging from 0 wt % to about 0.5 wt %; and a balance of iron), while having from about 3 vol. % to about 15 vol. % of retained austenite and from about 85 vol. % to about 97 vol. % of martensite. Moreover, the steel part has a tensile strength of at least 1500 MPa. In an example, the steel part has a tensile strength ranging from 1500 MPa to about 1800 MPa. Tensile strength may be measured by a standard tensile test as defined in ASTM E8: standard test methods for tension testing of metallic materials. The steel part may also have a Charpy V-notch impact toughness of at least 60 J/cm$^2$ at a temperature ranging from about −150° C. to about 25° C. The Charpy V-notch impact toughness is a standardized high strain-rate test which determines the amount of energy absorbed by a material during fracture. In an example, the steel part has a tensile strength of at least 1800 MPa, and the Charpy V-notch impact toughness of the steel part ranges from about 60 J/cm$^2$ to about 100 J/cm$^2$ at these temperatures.

With these characteristics, the steel composition disclosed herein may be used to replace existing low manganese containing steel compositions, such as 22MnB5. With higher toughness, less of the steel composition disclosed herein may be used, thus enabling thinner and lighter weight parts to be obtained.

To further illustrate the present disclosure, an example is given herein. It is to be understood that this example is provided for illustrative purposes and is not to be construed as limiting the scope of the disclosure.

Example

The medium manganese steel composition disclosed herein was used to form example steel parts. In particular, the medium manganese steel composition was: 0.15 wt % C, 7.3 wt % Mn, 0.25 wt % Si, 0.1 wt % Cr and other trace elements, such as N, P and S. A low manganese steel composition, namely 22MnB5, was used to form comparative steel parts. The steel composition of 22MnB5 was: 0.22 wt % C, 1.2 wt % Mn, 0.2 wt % Si, 0.04 wt % Al, 0.15 wt % Cr and 0.004 wt % B, plus other trace elements, such as N, P, Ti and S. The example steel composition had a lower $A_f$, $M_s$, and $M_f$ than the comparative example steel composition, as shown in Table 1.

TABLE 1

Properties of Steel Compositions

| | $A_f$ (° C.) | $M_s$ (° C.) | $M_f$ (° C.) |
|---|---|---|---|
| Medium Manganese Steel Composition (example) | 718 | 230 | <room temperature |

TABLE 1-continued

Properties of Steel Compositions

| | $A_f$ (° C.) | $M_s$ (° C.) | $M_f$ (° C.) |
|---|---|---|---|
| 22MnB5 Steel Composition (comparative example) | 810 | 337 | 275 |

Figures 3A, 3B:
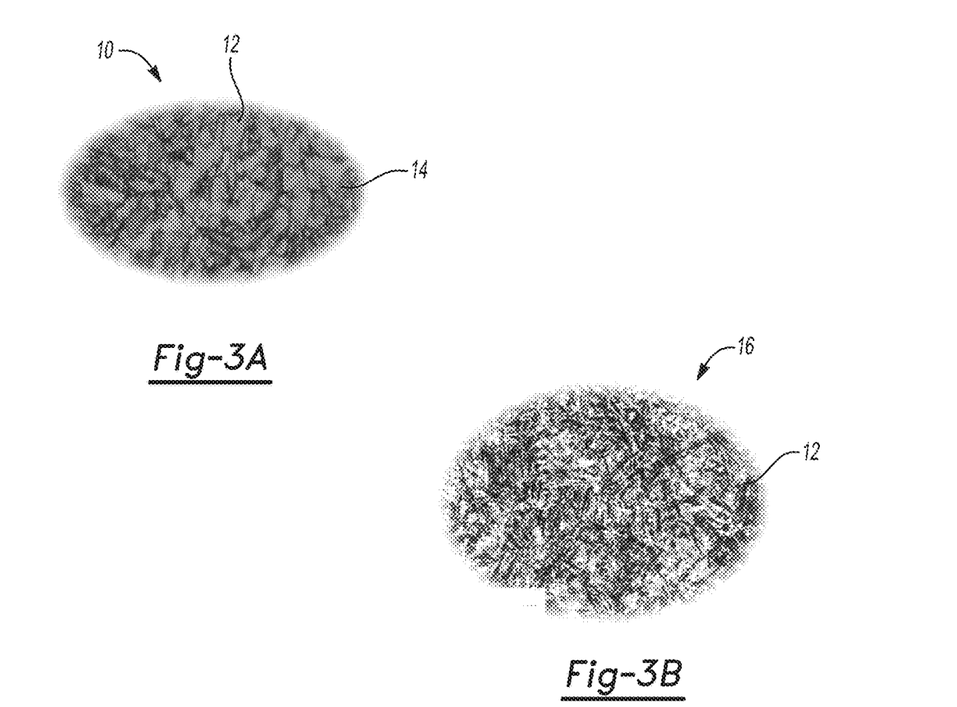
FIG. 3A is a schematic illustration of an example of a steel composition disclosed herein having a martensitic and retained austenite microstructure.
FIG. 3B is a schematic illustration of a comparative steel composition having a fully martensitic microstructure.

A 300 mm×300 mm blank of the example steel composition was heated to about 800° C., and was held at that temperature for about 360 seconds, and then was formed and quenched to room temperature between a pair of flat dies. A schematic illustration of the phases of the steel part 10 that are formed is shown in FIG. 3A. The steel part 10 included about 10% retained austenite 14 and about 90% martensite 12.

A 300 mm×300 mm blank of the comparative example steel composition was heated to a temperature of 930° C., and was held at that temperature for about 390 seconds, and then was formed and quenched to room temperature, which was below the $M_f$ temperature, between a pair of flat dies. A schematic illustration of the phase of the comparative steel part 16 that is formed is shown in FIG. 3B. The comparative steel part 16 included 100% martensite 12.

Figure 4:
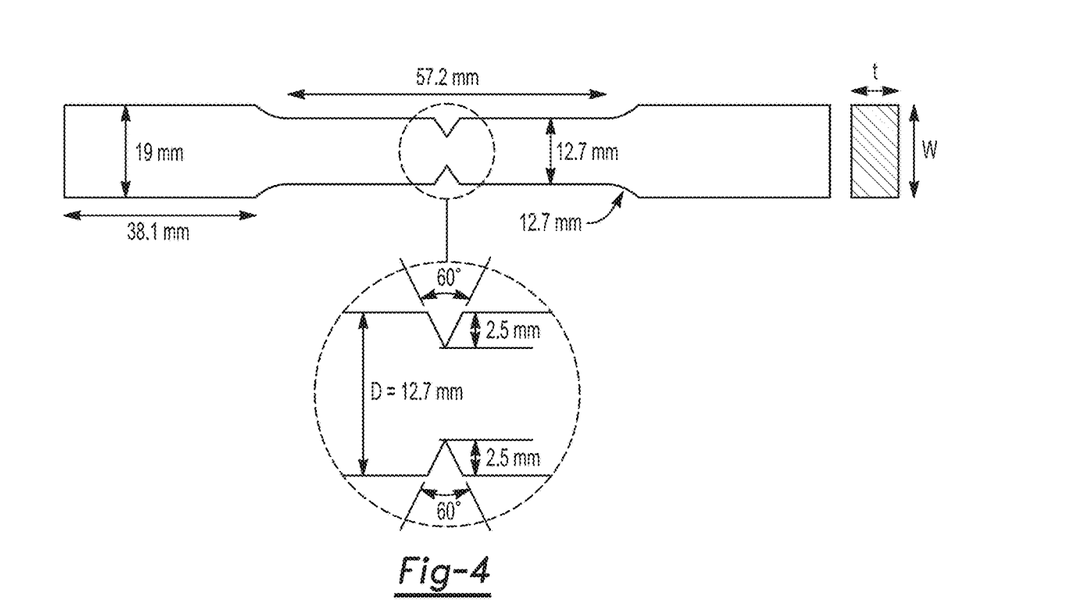
FIG. 4 is a schematic diagram illustrating a sample geometry used in a double-edge-notched-tensile (DENT) test.

Four example dog-bone samples (10A, 10B, 10C, 10D) and 4 comparative example dog-bone samples (16A, 16B, 16C, 16D) were cut from the previously described steel part 10 and the previously described comparative steel part 16. The example and comparative example dog-bone samples were prepared with the geometry and dimensions shown in FIG. 4, which are for a Double-Edge-Notched-Tensile (DENT) test. The notch root radius was 0.8 mm.

The DENT test was performed as follows: Strain (c) was determined by dividing the extension (ΔL), measured from a clip-on (mechanical) extensometer, by the gage length of the tensile sample (L=50 mm). As such, ε=(DL)/(L). Due to the notch, the sample field is not uniform. Therefore, c is an averaged measure of deformation near the notch. Stress (σ) is calculated by dividing the tensile force by the net cross-section area at the notch root. As such, σ=(Force)/[t*(D−2*2.5 mm)]. Stress calculated in this manner is an averaged measurement.

Figure 5A:
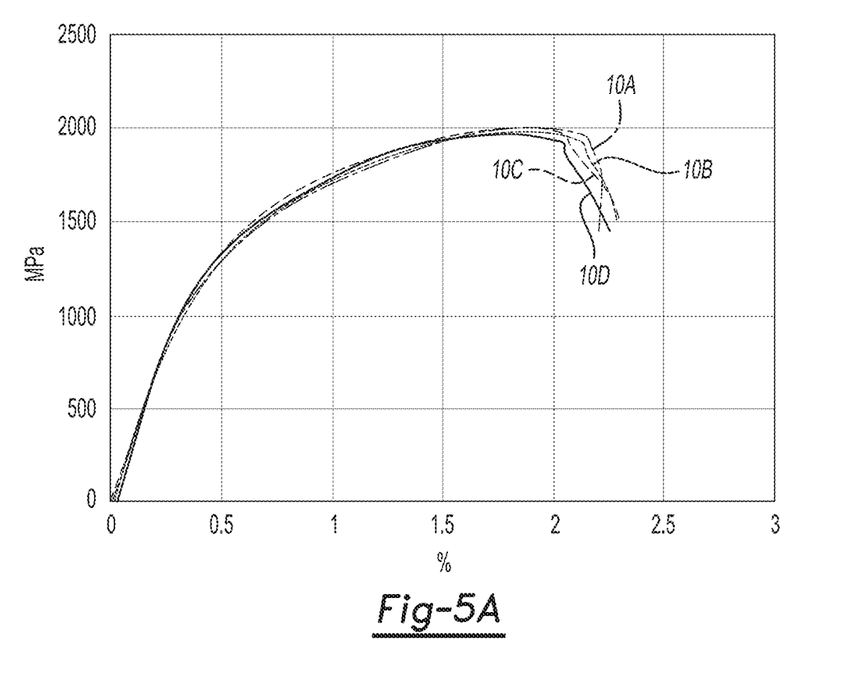
FIG. 5A is a graph of the engineering stress (MPa, σ, Y axis) versus the engineering strain (%, ε, X axis) from the DENT test for an example of a steel part disclosed herein.
Figure 5B:
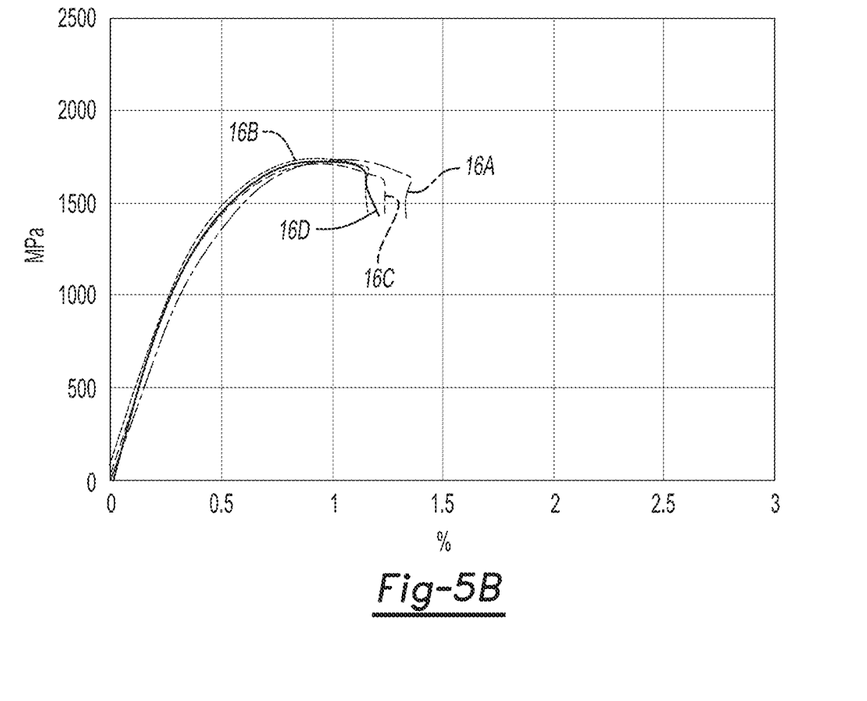
FIG. 5B is a graph of the engineering stress (MPa, σ, Y axis) versus the engineering strain (%, ε, X axis) from the DENT test for a comparative steel part.

The results (in terms of the stress (σ, MPa, Y axis) versus the strain (ε, %, X axis)) for the example dog-bone samples are shown in FIG. 5A and the results for the comparative example dog-bone samples are shown in FIG. 5B. In each figure, the area under the curve up to the peak stress point presents the energy per volume to crack the sample. Clearly, more energy per volume was needed to crack the example dog-bone samples than to crack the comparative example dog-bone samples, and thus the example dog-bone samples were tougher than the comparative example dog-bone samples.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 5 wt % to about 10 wt % should be interpreted to include not only the explicitly recited limits of from about 5 wt % to about 10 wt %, but also to include individual values, such as 5.5 wt %, 7.75 wt %, 8 wt %, etc., and sub-ranges, such as from about 6 wt % to about 9 wt %, from about 5 wt % to about 8 wt %, from about 7 wt % to about 9.5 wt %, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for increasing steel impact toughness, the method comprising:
   hot forming a steel composition to form a steel part, the steel composition containing from about 5 wt % to about 10 wt % manganese and having a martensite finish temperature ($M_f$) below room temperature, the hot forming including:
      subjecting the steel composition to a heat treatment temperature above a fully austenite formed temperature of the steel;
      transferring the steel composition to a die; and
      while in the die, simultaneously forming the steel composition and quenching the steel composition; and
   one of:
   a) wherein the quenching cools the steel composition to room temperature; and the method further comprises:
      removing the steel part from the die; and
      reheating the steel part to a baking temperature ranging from about 120° C. to about 400° C.; or
   b) the quenching is interrupted at an interruption temperature ranging from about 120° C. to about 400° C., and the method further comprises:
      maintaining the steel composition at the interruption temperature for a predetermined time; and
      cooling the steel composition to room temperature.

2. The method as defined in claim 1 wherein the baking temperature or the interruption temperature ranges from about 120° C. to about 200° C. and the reheating or the maintaining occurs for a time period ranging from about 5 minutes to about 120 minutes.

3. The method as defined in claim 2 wherein a maximum baking temperature during the reheating or a maximum interruption temperature is below a martensite start temperature ($M_s$) of the steel composition.

4. The method as defined in claim 1 wherein the baking temperature or the interruption temperature ranges from about 200° C. to about 400° C. and the reheating or the maintaining occurs for a time period ranging from about 1 minute to about 30 minutes.

5. The method as defined in claim 4 wherein a maximum baking temperature achieved during the reheating or a maximum interruption temperature is above a martensite start temperature ($M_s$) of the steel composition.

6. The method as defined in claim 1 wherein:
   the heat treatment temperature ranges from about 720° C. to about 850° C.; and
   the heat treatment occurs for a heat treatment time period ranging from about 180 seconds to about 1000 seconds.

7. The method as defined in claim 1 wherein the quenching is interrupted at the interruption temperature, and the predetermined time that the steel composition is maintained at the interruption temperature is up to 5 seconds.

8. The method as defined in claim 1 wherein the quenching involves cooling the die by a liquid medium.

9. The method as defined in claim 1 wherein room temperature is between a martensite start temperature ($M_s$) of the steel composition and the $M_f$ of the steel composition.

10. The method as defined in claim 1 wherein the quenching occurs for a quenching time period ranging from about 5 seconds to about 1000 seconds.

11. The method as defined in claim 1 wherein the steel composition further includes:
   carbon in an amount ranging from about 0.1 wt % to about 0.4 wt %;
   a total amount of silicon and aluminum ranging from 0 wt % to about 3 wt %;
   chromium in an amount ranging from 0 wt % to about 0.5 wt %;
   molybdenum in an amount ranging from 0 wt % to about 0.5 wt %; and
   a balance of iron.

12. The method as defined in claim 1 wherein after the reheating, the method further comprises cooling the steel part to a temperature ranging from about 18° C. to about 25° C.

13. The method as defined in claim 1 wherein after the reheating or the maintaining and the cooling, the steel part has a tensile strength of at least 1500 MPa and a Charpy V-notch impact toughness of at least 60 J/cm$^2$ at a temperature ranging from about −150° C. to about 25° C.

14. The method as defined in claim 1 wherein after the reheating or the maintaining and the cooling, the steel part includes:
   retained austenite in an amount ranging from about 3 vol. % to about 15 vol. % based on a total vol. % of the steel part; and
   martensite in an amount ranging from about 85 vol. % to about 97 vol. % based on a total vol. % of the steel part.

15. The method as defined in claim 1 wherein the reheating involves heating the steel part in a furnace, direct flame heating the steel part, heating the steel part via induction, or heating the steel part via resistance heating.

16. A steel part, comprising:
   manganese in an amount ranging from about 5 wt % to about 10 wt %;
   carbon in an amount ranging from about 0.1 wt % to about 0.4 wt %;
   a total amount of silicon and aluminum ranging from 0 wt % to about 3 wt %;
   chromium in an amount ranging from 0 wt % to about 0.5 wt %;
   molybdenum in an amount ranging from 0 wt % to about 0.5 wt %; and
   a balance of iron;
   wherein:
   from about 3 vol. % to about 15 vol. % of the steel part is retained austenite;
   from about 85 vol. % to about 97 vol. % of the steel part is martensite; and
   the steel part has a Charpy V-notch impact toughness ranging from about 60 J/cm$^2$ to about 100 J/cm$^2$ at a temperature ranging from about −150° C. to about 25° C.

17. The steel part as defined in claim 16, wherein the steel part is selected from the group consisting of a door impact beam, a bumper beam, an AB pillar, a roof rail, a central floor tunnel, and a lawn mower blade.

18. A steel composition, comprising:
   manganese present in an amount sufficient to provide a Charpy V-notch impact toughness ranging from about 60 J/cm$^2$ to about 100 J/cm$^2$ at a temperature ranging from about −150° C. to about 25° C. after the steel composition has been exposed to a post hot forming reheating process that involves a baking temperature ranging from about 120° C. to about 400° C. or to a quenching interruption process that involves a maintenance temperature ranging from about 120° C. to about 400° C.;
   carbon in an amount ranging from about 0.1 wt % to about 0.4 wt %;
   a total amount of silicon and aluminum ranging from 0 wt % to about 3 wt %;
   chromium in an amount ranging from 0 wt % to about 0.5 wt %;
   molybdenum in an amount ranging from 0 wt % to about 0.5 wt %; and
   a balance of iron.

19. The steel composition as defined in claim 18 wherein the amount of manganese ranges from about 5 wt % to about 10 wt %.

20. The steel composition as defined in claim 18 wherein a martensite finish temperature ($M_f$) of the steel composition is below room temperature.

* * * * *